UNITED STATES PATENT OFFICE.

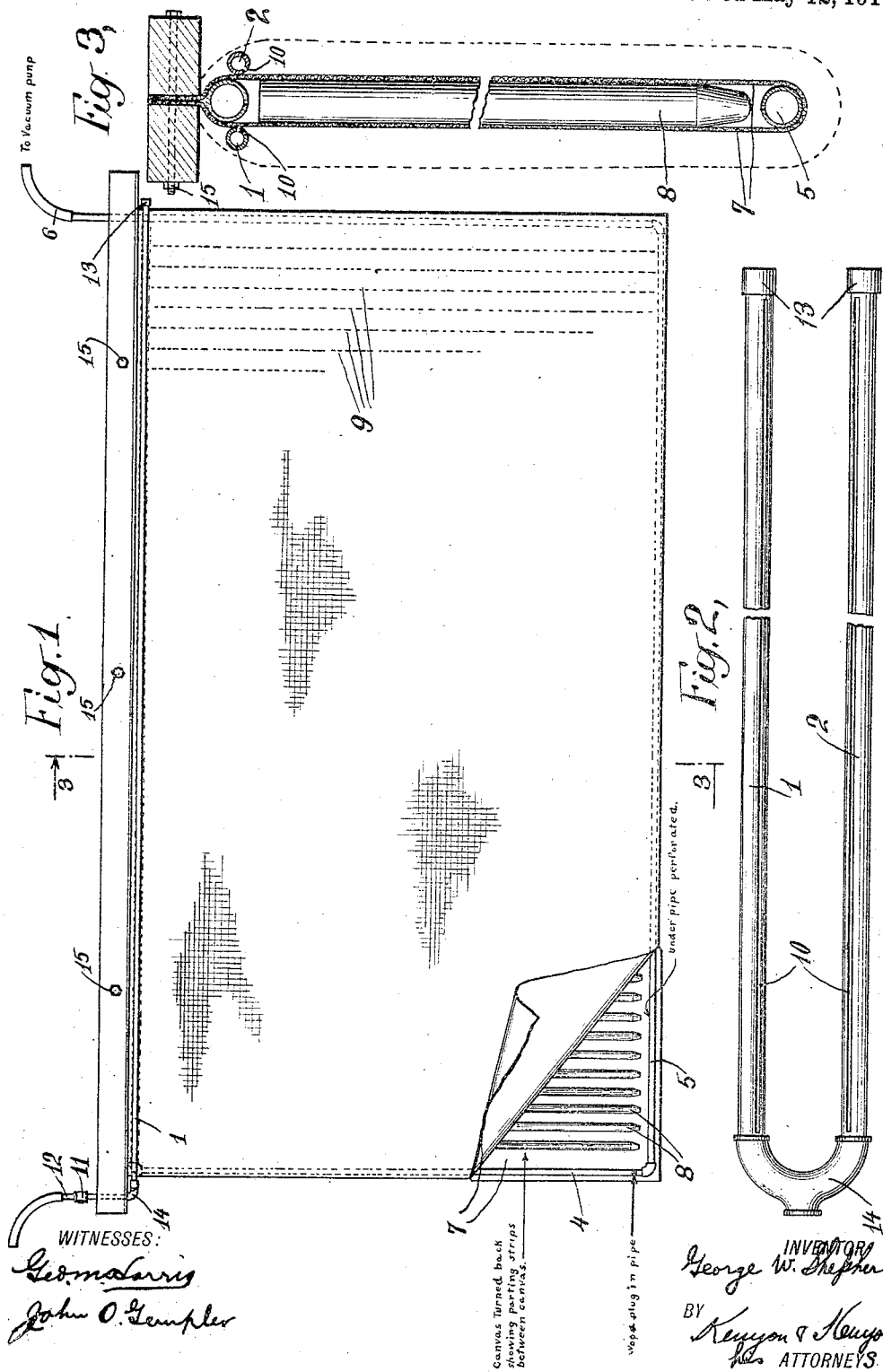

GEORGE W. SHEPHERD, OF NEW YORK, N. Y., ASSIGNOR TO THE BUTTERS PATENT VACUUM FILTER COMPANY, INC., A CORPORATION OF NEVADA.

PROCESS OF DISLODGING SLIME CAKES.

1,096,132.  Specification of Letters Patent.  Patented May 12, 1914.

Application filed May 1, 1913. Serial No. 764,842.

*To all whom it may concern:*

Be it known that I, GEORGE W. SHEPHERD, a citizen of the United States, and a resident of the city, county, and State of New York, have invented new and useful Improvements in Processes of Dislodging Slime Cakes, of which the following is a specification.

The object of my invention is to effectively and rapidly dislodge slime cakes which are formed on the filter surfaces of filter leaves during the process of filtering compounds, resulting from the well known cyanid process of treating ores.

My invention may be used with analogous compounds, of course.

My invention consists in applying water under pressure externally of the filter leaf in such a way that the time for the cake dislodgment is materially shortened and the surface of the leaf is thoroughly cleansed.

Specifically, my invention consists in applying water under pressure near the top of the leaf and underneath the surface of the cake for a substantial distance between the cake and the filter medium.

By my invention the cake may be completely dislodged without any internal pressure whatever, thus saving the filter medium the wear and tear incident to internal pressure, but it may be used with internal pressure also, if desired.

My process of cake dislodgement has a great advantage over other processes of external dislodgment, in that they apply the spray or sheet of water on to the outside of the cake, while by my process the water is applied beneath the surface of the cake or inside the cake. In former processes the tendency of the water was to make the cake adhere more closely to the filter leaf by reason of the external pressure and wetting of the cake caused by the spray. In previous processes the cake would hang on to the filter medium until washed away or carried off piecemeal or in a solution, so to speak. By my method I force the cake away from the filter medium in bulk by pressure and do not depend upon piece-meal washing away of the cake. It is sometimes found that when pressure is created between the cake and the filter medium according to my process they are separated a distance below the opening in the dislodging pipes before the cake is separated at its top thus confining the pressure for a short time between the cake and the medium. This is for a short time only, however, so that when the top is separated the cake comes clear of medium thereby cleaning the entire surface in a very short time.

My invention has many advantages, chief of which is the saving in time and in amount of water used. It is to be remembered that water is valuable in a large plant and considerable saving thereof is greatly to be appreciated. Other advantages of my invention will be apparent after reading the following detailed description taken in connection with the accompanying drawings, in which—

Figure 1 is a side elevation of a filter leaf which may be used in my process; Fig. 2 is a bottom view of piping used for supplying water to dislodge the cake; and Fig. 3 is an enlarged section on line 3—3 of Fig. 1 with a cake thereon shown in dotted lines.

In Fig. 1, 4 represents the frame, which may be of any construction, but it preferably consists of tubing, the bottom member 5 of which is perforated or slotted, the perforations or slot opening into the interior of the leaf. This member is connected in this instance through the right-hand end frame-member with a vacuum pump, not shown, through any suitable connection, as 6.

7—7 are filter media, one on each side of the frame. These are held apart during the filtering process by any suitable spacing means such as wooden sticks 8. The filter media are stitched together, as shown, at dotted lines 9, for the purpose of holding the spacing sticks in place. Any number of sticks may be placed between successive stitched portions. This stitching is useful in preventing ballooning if internal pressure is placed on the leaf. The upper part of the filter media 7 is securely clamped between the headers 16 by means of bolts 15.

1, 2 represent small pipes running along the upper portion of the leaf. Each of these pipes has openings or a slot 10 along the length thereof extending substantially the whole length of the leaf. These slots or rows of openings are preferably placed on the lower side of the pipes and slightly inward toward the filter surface so that the water will be applied in the direction thereof. The outer end of the pipes is closed by an ordinary cap 13. The pipes are joined by a suitable fixture 14 which is arranged to be connected to the supply pipe 12. It is desirable that the openings in the pipes 1, 2 be so arranged that they will lie beneath the surface of the cake (Fig. 3) which is formed during the filtering operation so that when water is admitted to the pipes it will be initially applied beneath the surface of the cakes and between the cakes and the filter media. It may be found desirable in some cases to protect these slots or openings so as to prevent the deposit, by sedimentation or otherwise, of particles therein. To that end a suitable valve, such as a check-valve 11, is placed in the pipe 12 through which water under pressure is admitted to the dislodging pipes 1 and 2. This valve is arranged to open toward the leaf and to close in the reverse direction so that there will be no movement of liquid into the pipe 12. The pipe 12 is connected with any suitable water supply under pressure.

While the dislodging pipes 1, 2 are shown as being on a level with the lower side of the top frame pipe it is to be understood that my invention is not limited to this arrangement, as they may be either above or below this point. These pipes may be of any desirable shape in cross-section.

It is understood, of course, that my process may be used to dislodge cakes under many conditions. In fact, it can be used as a step in any of the processes of filtering now in use. Specifically it may be used to dislodge a cake while the leaf is submerged or while the leaf is suspended in air. It is also applicable whether or not internal water exists in the leaf, also with or without internal pressure, as for instance, after decanting the water bath. It may also be used with or without drying the cake by continued vacuum after the cake is removed from liquid.

While I have described my invention with the use of water, I have done so for convenience only, as air or other fluid may be used with satisfactory results, and all are within my invention. Water is generally used for this purpose, however, and is preferred.

My invention is not limited to any particular kind of pipe or passage for dislodging fluid as there may be many ways of accomplishing this. In its broadest aspects my invention is independent of the means for admitting fluid under pressure beneath the surface of the cake formation.

I filed, on September 3, 1913, a divisional application, Serial No. 787,838, in which I have shown, described and claimed a leaf which may be used with the process claimed herein.

Having described my invention what I claim as new and desire to secure by Letters Patent is:—

1. The process of dislodging cakes from filter leaves which consists in admitting a pressure medium into the cake near the surface of the filter medium.

2. The process of dislodging cakes from filter leaves which consists in admitting fluid under pressure into the cake near the surface of the filter medium.

3. The process of dislodging cakes from filter leaves which consists in admitting fluid under pressure for a substantial distance between the cakes and the filter media of said leaves.

4. The process of dislodging slime cakes from filter leaves, which consists in applying water under pressure for a substantial distance beneath the surface of the cake and outside of the leaf.

5. The process of dislodging slime cakes from filter leaves, which consists in applying water under pressure at the top portion of the cake and beneath the surface thereof.

6. The process of dislodging slime cakes from filter leaves, which consists in applying a sheet of water between the cake and the filter medium.

7. The process of dislodging a slime cake from a filter leaf, which consists in applying a stream of water the whole length of the leaf between the cake and the filter medium.

8. The process of cleaning a filter surface of slime cakes, which consists in applying a substantially uninterrupted stream of water at the upper interior portion of the cakes.

9. The process of cleaning a filter surface of slime cakes, which consists in applying a sheet of water under pressure substantially along the upper line of cake formation and beneath the surface of said cake.

In testimony whereof, I have signed my name to this specification, in the presence of two subscribing witnesses.

GEORGE W. SHEPHERD.

Witnesses:
 EDWIN SEGER,
 NEWTON A. BURGESS.